Patented May 9, 1939

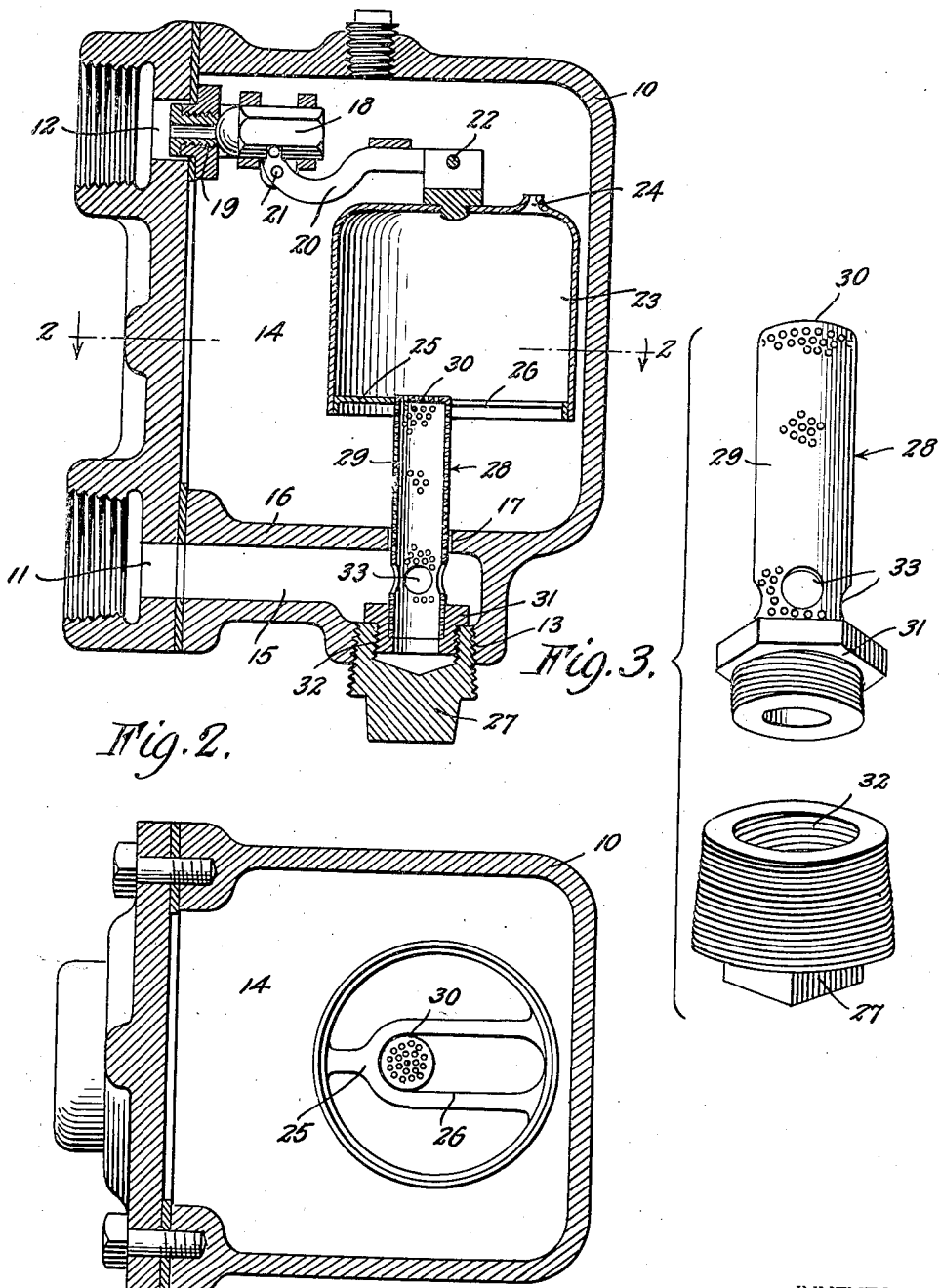

2,157,470

UNITED STATES PATENT OFFICE 2,157,470

STEAM TRAP

Thomas Napier Adlam, West Orange, N. J.

Application June 23, 1937, Serial No. 149,860

4 Claims. (Cl. 236—53)

This invention relates to steam traps and has more particular reference to certain improvements in steam traps of the inverted bucket type which function to intermittingly open for discharging air and water and close against the egress of steam therethrough.

Among the salient novel features and objects of the invention are an improved steam trap structure of the indicated character which embodies means for straining the fluid as it enters the trap so as to intercept and separate foreign matter therefrom; the utilization of a strainer element for this purpose which is carried by the cleanout plug and which is preferably detachably associated therewith; the provision of a light weight bucket having suitable reenforcing means associated with the open lower end so as to prevent distortion thereof and the employment of the strainer element and reenforcing means as interengageable members for guiding and limiting the swinging movement of the bucket in order to insure proper uniform operation of the trap under all conditions.

The invention furthermore comprehends in one of its forms, a thermostatically actuated valve for controlling a vent opening which is either provided in lieu of or auxiliary to the usual fixed vent opening whereby the inverted bucket will more rapidly vent the air and expedite the discharge of the condensate from the system.

With the above enumerated and other objects in view the invention is set forth in greater detail in the following specification, illustrated in the accompanying drawings and pointed out in the appended claims.

In the drawings:

Fig. 1 is a vertical sectional view through a steam trap constructed in accordance with one form of the invention.

Fig. 2 is a horizontal sectional view therethrough taken approximately on the line 2—2 of Fig. 1.

Fig. 3 is a collective perspective view of the cleanout plug and strainer in separated juxtaposition.

Figure 4:
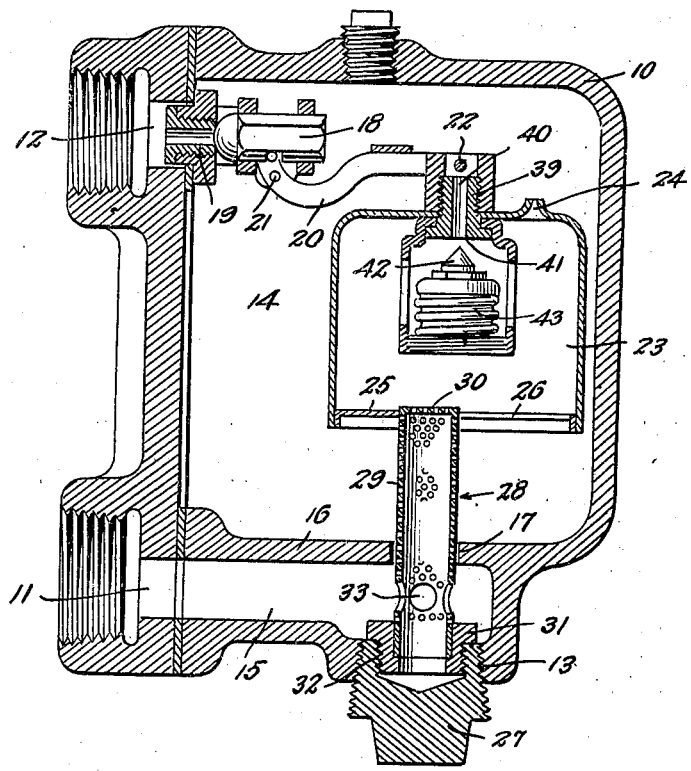
Fig. 4 is a vertical sectional view through a steam trap embodying a thermostatically actuated valve for controlling the vent.

Referring to the drawings by characters of reference the trap includes a casing 10 having inlet and outlet ports 11 and 12 and a cleanout port 13. The casing is subdivided into upper and lower compartments 14 and 15 by a horizontal partition 16 having a passage 17 disposed in axial alignment with the cleanout port 13.

The outlet port 12 is controlled by a sliding valve 18 which is moved into and out of closed relation with a seat 19 by means of a lever 20 which is fulcrumed as at 21. The lever has pivotally attached to its free outer end as at 22, a depending inverted bucket 23 which is of lightweight material drawn or otherwise formed from sheet metal and which is provided with a fixed vent 24 in its upper closed end. The lower open end has secured therein a reenforcing element 25 which functions to prevent distortion thereof and which is provided with a guide slot 26. A closure plug 27 normally closes the cleanout port 13 and has detachably associated with its upper end a strainer 28 which comprises a perforated tubular wall 29 and a perforated upper end wall 30, the lower open end having an externally threaded collar 31 which screws into the threaded recess 32 in the upper end of the plug. The strainer 28 extends upwardly through the passage 17 and into the guide slot 26 of the reenforcing element 25. The portion of the strainer which is disposed within the lower compartment 15 of the trap casing 10 is formed with enlarged apertures 33 to provide free access of the fluid to the interior of the strainer as it enters the compartment 15 through the inlet 11.

In operation the foreign matter in the fluid will be intercepted and separated therefrom by the strainer as it passes therethrough, while the upper end of the strainer 28 coacting with the guide slot 26 will limit the swinging movement of the bucket 23 and guide the same so as to insure a proper uniform operation of the trap. The strainer may be periodically cleansed and foreign matter removed from the lower compartment 15 by the removal of the cleanout plug 27 and the detachment of the strainer 28 from the plug.

Figure 5:
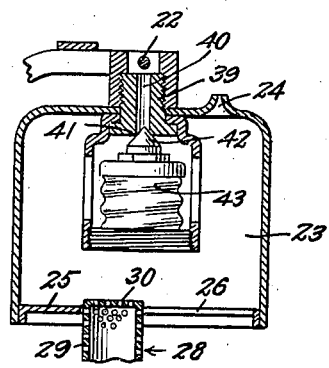
Fig. 5 is a fragmentary detailed view illustrating the vent valve in closed relation.

In the modified form of the invention illustrated in Figs. 4 and 5 of the drawings, the upper end of the bucket is provided with an apertured bushing 39 providing a vent opening 40 which may be employed in lieu of or auxiliary to the fixed vent 24 and said bushing defines a valve seat 41 which is opened and closed by a valve element 42 carried by a thermostatically actuated element 43 supported by and depending from the upper wall of the bucket 23. The thermostatically actuated valve 42 which controls the vent opening is normally unseated so as to rapidly vent the air from the system through the outlet 12 and expedite the discharge of the condensate but is expeditiously closed by expansion of the thermostatic element 43 when the steam enters the bucket so as to effect the raising of the arm 20 and closing of the valve 18 to prevent the escape of steam from the trap.

What is claimed is:

1. In a steam trap, a casing having inlet, outlet and cleanout ports, a removable closure plug for the cleanout port, a strainer having a perforated tubular wall and a perforated upper end wall carried by and protruding upwardly from the closure plug, a valve controlling the casing outlet, a lever for actuating said valve, an inverted bucket swingably carried by the lever and disposed over the upper end of said strainer, and means within the lower open end of said bucket cooperating with the upper end of the strainer to guide and limit the swinging movement of the bucket with reference to the lever.

2. A steam trap including a casing having inlet, outlet and cleanout ports, a removable closure plug for the cleanout port, a partition defining a compartment at the lower portion of said casing with which the intake and cleanout ports communicate, said partition having a passage in axial alignment with the cleanout port, a strainer having a perforated tubular wall, a perforated upper end wall and an open lower end detachably associated with the closure plug, protruding upwardly therefrom through the passage and having enlarged apertures in the tubular wall thereof located within said compartment.

3. A steam trap including a casing having inlet, outlet and cleanout ports, a removable closure plug for the cleanout port, a partition defining a compartment at the lower portion of said casing with which the intake and cleanout ports communicate, said partition having a passage in axial alignment with the cleanout port, a strainer having a perforated tubular wall, a perforated upper end wall and an open lower end detachably associated with the closure plug, protruding upwardly therefrom through the passage and having enlarged apertures in the tubular wall thereof located within said compartment, a valve for said outlet and control means therefor including an inverted swingably mounted bucket of light-weight material, and a reenforcing element secured within the lower open end of said bucket having a slotted portion receiving the upper end of the strainer and cooperating therewith to guide the bucket in its swinging movement during the operation of the trap.

4. In a steam trap, a casing having inlet and outlet ports, a valve controlling said outlet port, actuating means for said valve including a lever, an inverted bucket having an apertured upper wall, a bushing extending through the apertured upper wall of the bucket having a venting port, means attached to the protruding upper end of the bushing swingably connecting the bucket with the lever, a thermostatically controlled valve carried by the bushing and adapted to cooperate with the lower end of the venting port to close and open the same, an upwardly protruding tubular strainer at the lower end of the trap casing, and slotted means carried by the lower open end of the bucket cooperating with said strainer to guide the bucket in its swinging movement during the operation of the trap.

THOMAS NAPIER ADLAM.